March 6, 1951 B. W. CHITTENDEN 2,544,488
PROCESS AND APPARATUS FOR MAKING CONCRETE BLOCKS
Filed May 19, 1948 2 Sheets-Sheet 1

INVENTOR.
BARRETT W. CHITTENDEN,
BY
ATTY

March 6, 1951  B. W. CHITTENDEN  2,544,488
PROCESS AND APPARATUS FOR MAKING CONCRETE BLOCKS
Filed May 19, 1948  2 Sheets-Sheet 2
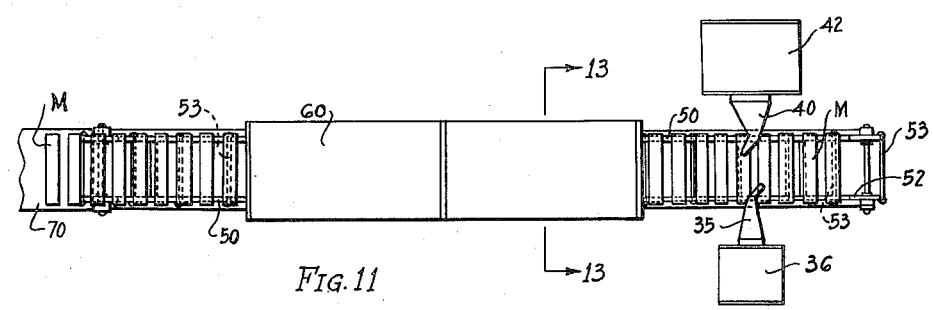
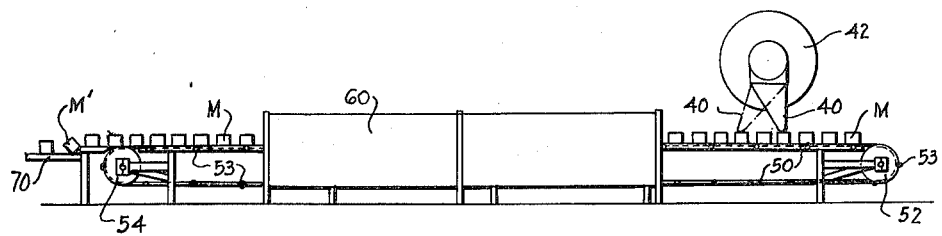
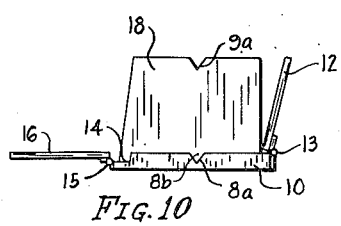
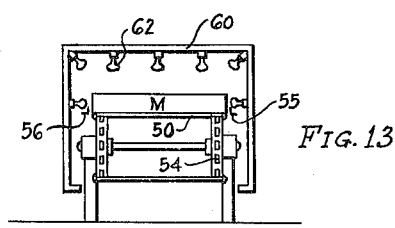
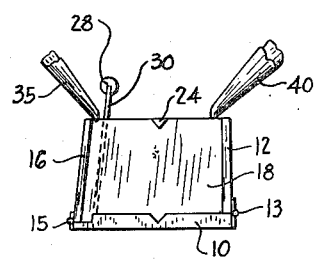
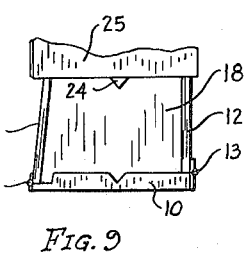
INVENTOR.
BARRETT W. CHITTENDEN
BY
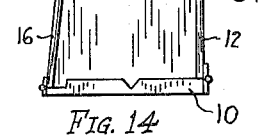
ATTY Patented Mar. 6, 1951

2,544,488

UNITED STATES PATENT OFFICE 2,544,488

PROCESS AND APPARATUS FOR MAKING CONCRETE BLOCKS

Barrett W. Chittenden, Bedford, Ohio, assignor to Finlok Block, Inc., East Cleveland, Ohio Application May 19, 1948, Serial No. 28,013

6 Claims. (Cl. 25—2)

This invention relates to a method and apparatus for making concrete blocks, and is particularly concerned with the making of blocks having dense and porous or fine and coarse composition for one side of and the body of the block, respectively.

Such blocks may have special features such as a sloping face with an overhanging flange, central voids, exceptionally accurate horizontal and vertical end surfaces, such, for example, as shown, described and claimed in my application, Serial No. 14,917, filed March 15, 1948, for "Building Block and Wall Construction."

Objects of the present invention include the making of blocks for the running courses, as well as corner blocks, by a series of simple and efficient steps requiring the use of a minimum of filling and handling apparatus.

Another object of the invention includes an operation for quick setting of the wet concrete in the molds, by passing them through a heating zone for a brief period of time, which is sufficient to so set the concrete that the molds may be removed and the blocks then may be handled for stacking, drying and hardening or curing before subsequent use.

More specific objects include the arrangement of the steps of manufacture and means for carrying out these steps so that the fine and coarse, or dense and porous, material may be poured from two separate mixers into the single mold in the proper quantities to effect the forming of the fine mixture into a thin slab on the one side of the body of the block in the mold, and while the mold is moving toward the heating zone along a suitable conveyor.

Other objects include the simplicity of construction of the mold to provide for forming blocks of precise dimensions and accurate surfaces, and capable of convenient removal from the blocks. In this connection an object attained by the invention is with use of a minimum number of molds for production of large quantities of such specially constructed concrete blocks.

More specific objects include details of mold construction whereby the running course blocks and the corner blocks may be similarly formed and handled. Other objects and advantages will become apparent in the following specification which relates to the accompanying drawings, in which:

Fig. 8 is an end view of the mold showing the spouts leading the two types of material to the mold;

Fig. 9 is a similar view showing a scraper for leveling the material at the top of the mold;

Fig. 10 is an end view of the block and mold showing the manner of opening the mold to remove the block;

Fig. 11 is a plan view of a conveyor heating apparatus and mixers with pouring spouts;

Fig. 12 is a side elevation of the same, showing only one of the mixers;

Fig. 13 is an end elevation, slightly enlarged, showing the oven or heating tunnel conveyor and a mold therein; and Fig. 14 is an end elevation of the mold, showing a locking and cover member at the top thereof.

Figure 1:
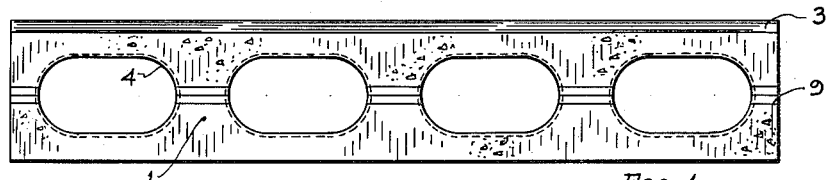
Fig. 1 is a plan view of a special form of concrete block.
Figure 2:
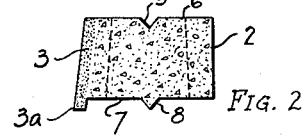
Fig. 2 is a transverse section through the same.
Figure 3:
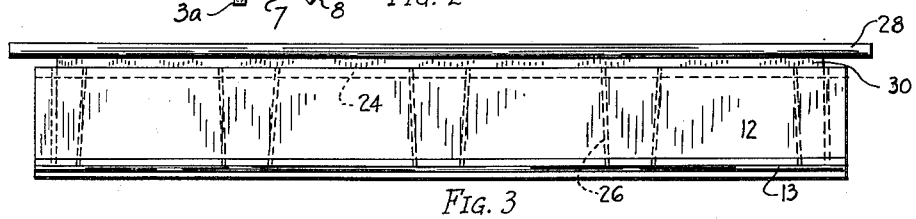
Fig. 3 is a side elevation of a mold for making the block shown in Figs. 1 and 2.
Figure 4:
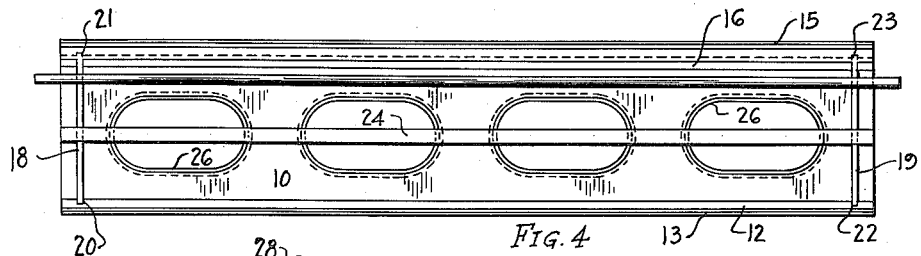
Fig. 4 is a plan of the same.
Figure 5:
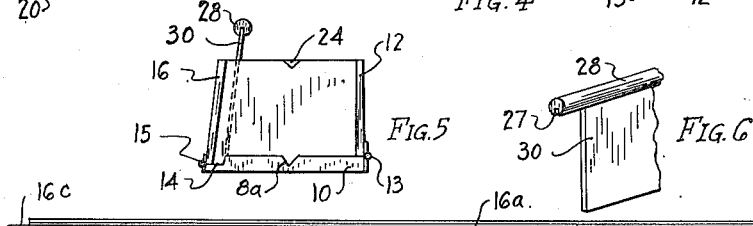
Fig. 5 is an end elevation of the mold shown in Figs. 3 and 4.
Figure 6:
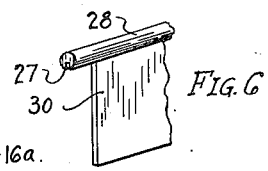
Fig. 6 is a perspective detail showing a separator plate between the dense panel portion and coarse body of the block used in the mold while pouring.

Referring particularly to Figs. 1 and 2, the composite concrete wall block unit 1, such as referred to, comprises essentially a body portion 2—preferably made of coarse concrete—and a front face portion or slab 3 of relatively fine impervious and smooth facing material on the sloping face of the block, which becomes the outer face when laid in the wall.

Horizontal top and bottom surfaces 6 and 7 are provided with interlocking ribs and grooves, such as shown at 8 and 9, while voids 4—preferably tapering outwardly slightly toward the bottom—are formed at regular intervals in the block.

The mold for forming such a block may comprise essentially a bottom plate 10, a rear wall plate 12, shown as hinged at 13 to the bottom plate, preferably along its full length.

The bottom plate 10 is provided with a flat upper surface forming the surface 7 of the block, and a longitudinal groove 8a forming the rib 8 on the block.

The forward side of the bottom plate is provided with an offset portion 14, provided with a downward projection 3a which provides for the overlapping clapboard effect.

A front wall plate 16 is shown as hinged at 15 to the bottom plate to permit it to be swung outwardly as the hinge 13 provides for swinging the plate 12, as shown in Fig. 10.

The ends of the mold are preferably closed by transverse plates 18 and 19 which may engage grooves 20, 21, 22 and 23 at their vertical rear edges and sloping front edges, thus interfitting with the plates 12 and 16, respectively. These plates are provided with projections 8b fitting the grooves in the bottom plate 10, and with notches 9a for receiving a triangular bar designated 24, extending across the top of the mold and forming the groove 9.

The height of the plates 12 and 16 and top surface of the bar 24 are uniform. To form the voids 4 the mold is provided with oblong upwardly and inwardly tapering hollow members 26 rising from the bottom plate 10 to the height of the side walls, and having recesses to receive the bar 24.

After pouring the concrete, the material may be leveled by a suitable straight edged scraper 25, as shown in Fig. 9. This leveling is effected after the removal of a separator plate 30 fitted into grooves, not shown, in the end plates, and positioned to slope parallel with the front plate 16 a distance of half an inch to an inch therefrom depending upon the desired thickness of the facing slab material 3 and the width of the overhang portion 3a formed in the offset 14.

The plate 30 is shown as having its upper edge fitted into a groove 27 in a bar 28 serving as a suitable handle by which it may be removed, sliding the ends upwardly in their grooves in the plates 18 and 19, and thus withdrawing this thin separator plate 30 from the wet fine and coarse concrete poured on either side thereof.

The sides of the mold may be held upright by any suitable means not shown.

The pouring of the fine and coarse concrete poured on the respective sides of the separator plate 30 may be through suitable conduits or spouts, indicated at 35 and 40 in Fig. 8. As stated, as the space on either side of the separator is filled level full or very slightly more, the separator plate is withdrawn, the surface smoothed as by the scraper 25, and the concrete is caused to set sufficiently for the block to hold its shape before opening the mold and removing the block.

If desired, the top of the mold and block material may be covered before passing through the heating zone, as, for example, by a plate 32 having flanges, as at 33 and 34, engaging the side members 12 and 16.

The special method of treating the concrete for quick setting to shorten the time of the use of the molds for making each block and for other purposes, and simultaneous pouring of both the facing and body mix, for rapid and economical production, are accomplished by steps and with an apparatus which will be presently described.

As stated, one of the advantages of my wall structure and the form of concrete blocks is that corner blocks may present the interfitting overlapping clapboard effect with the clapboard facings either on "outside corners" or "inside corners" while uniformly matching the blocks of the running courses.

Such corner blocks are disclosed and claimed in my co-pending application, above designated. The mold for one of said corner blocks is illustrated in Fig. 7.

Figure 7:
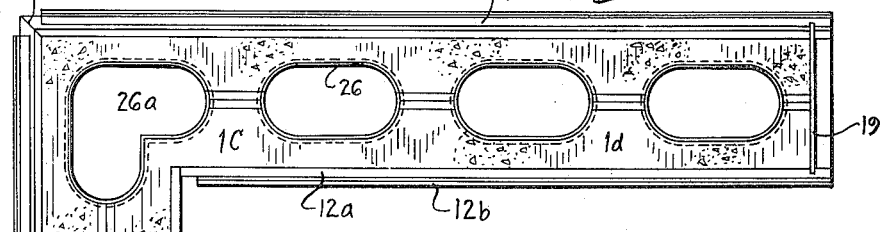
Fig. 7 is a plan view of a modified form of the mold for making corner blocks.
Figure 7:
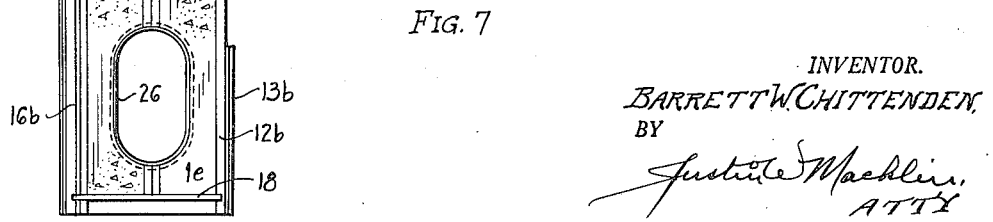

In Fig. 7 the block is designated 1C, and as shown its two leg portions 1d and 1e have the voids formed by the oblong hollow members 26 and a special void 26a at the corner. Here as before each leg of the block 1d and 1e corresponds in height and width and sloping front face with the offset at the front edge to the blocks 1 of the running courses.

The front and back plate members 12a and 16a and 12b and 16b are of a length suitable to enclose the adjacent side surface of the block, and the plates 16a and 16b are shown as fitting at a mitre joint 16c on the outer corner.

At the inner corner the plate 12a fits against the plate 12b, and a hinge 13b of the plate 12b is shortened to permit the plate 12a to swing downwardly on its hinge 12b, say, enough to permit the plate 12b to be swung downwardly over it.

End plates 18 and 19 are provided and supported, as before described.

In Figs. 11, 12 and 13 is illustrated a preferred arrangement for pouring the fine and coarse concrete into each mold, as the molds are moved in a series along a conveyor past concrete mixers for the two kinds of material, and thence through a heating tunnel or oven, and are delivered from the conveyor to a platform for opening the molds.

The pouring spouts 35 and 40 may extend from the delivery openings of concrete mixers 36 and 42, respectively. These spouts are preferably capable of movement so that each may swing, as indicated, from the position shown in solid lines to the position shown in broken lines, shown at 40a in Fig. 12, to permit the spout to follow the molds, conventionally shown at M, as they move along a conveyor.

The conveyor may be of any suitable construction. I have shown a link or belt type of conveyor 50 having cross members 53 and shown as passing over sprockets 52 and 54 mounted on a suitable frame structure which is provided with side guide rails 55 and 56 (Fig. 13).

Enclosing a portion of the conveyor for a distance of, say, fifteen to twenty-five feet, I provide an oven comprising a housing 60 in which are mounted a series of transverse rows of heating elements or lamps 62 positioned above and at the sides of the conveyor and the series of molds M passing therethrough.

At the delivery end of the conveyor I provide an offset or step-down platform 70 onto which the molds may be delivered, and as they are moved onto the same, they may be tipped, as indicated at M1, to facilitate opening the mold.

In operation the empty molds are placed upon the conveyor at the right hand end of Figs. 11 and 12, and as they come to the delivery spouts 30 and 35 these are swung into delivery position, and the pouring of concrete is started while each spout follows the movement of the mold pouring the concrete into the respective compartment at the proper side of the separator 30. This pouring may be simultaneously accomplished, or the fine concrete may be poured first, and the coarse concrete may follow, all within the range of movement which may be followed by the swing of the spouts, the movement being about one foot per minute, for example.

The separators 30 are removed after the pouring, and the top surface of the concrete may be smoothly leveled as with the scraper 25, and the filled molds then pass into the heating zone. As stated, if desired the filled molds may be covered before heating. The heat is applied by direct radiation and convection, subjecting the molds to a surrounding temperature, which may be four hundred or more degrees Fahrenheit, for a period of fifteen to twenty-five minutes, for example, during which the concrete is caused to quickly set or harden in a preliminary stage, and while the block is so confined as to lose a minimum of the moisture content. This heating has the effect of so hardening the mass of blocks, of, say, eight inches wide and of the proportions shown, that the mold may be safely removed and the block may be set aside or stacked on racks for a drying and curing period of several days, this curing period, of course, depending upon the nature of the mixture, as is well known in the art.

It will be seen, however, that the forming and pre-setting of mold blocks may be effected by this method while using each mold a relatively short time, namely, a half an hour or less for forming each block. Thus, a series of only fifty to one hundred molds may be used for the continuous production of completely formed, specially constructed concrete blocks at the rate of one every minute or two—depending on the nature of the mixture, the size and thickness of the body of the block, and the amount of heat which may be applied within safe limits for effecting the presetting without adversely affecting the strength and coherence and like properties of the block.

The handling of the molds for the corner blocks is similar to that of the molds for the straight blocks with the running courses, but by proper arrangement on the conveyor, the speed of filling and number of blocks within the heating zone may be comparable to that of filling the simpler molds for the running course blocks.

I have found that the block and wall construction of my prior application, above designated, has many advantages, but as there indicated it is highly essential that the blocks be accurately made and that they may be economically produced.

The great advantages of producing a block in which an outer layer of uniform thickness forms a sloping clapboard face on the weather side of the block, however, was attended with many difficulties of manufacture. It is essential that the facing be maintained of uniform thickness; that the top and bottom surfaces of the block be smooth in view of the contemplated use of a thin sealing layer of impervious cement instead of the usual mortar bed, and that the ends be tightly fitted and also capable of being sealed with a very thin layer of cement.

By my present method I attain these objectives and overcome these difficulties, and the proposed method allows the pouring on both sides of the separator plate without loss of time. The prompt application of heat prevents a settling of either the coarse or thin body of the mix—one into the other—while permitting a composite union between the coarse and fine layers, the cementing of which is assured by the prompt and effective application of high temperature; likewise the strength and other characteristics of the block are not impaired by reason of the shortness of the heating period, and the confining of the block during this application of heat—except for the top surface. As stated, I may use removable top plates or covers which aid in maintaining a level surface and further confine the moisture within the block during the pre-setting heat-applying interval.

From the foregoing description it will be seen that I have provided a simple and efficient mold equipment for making my special form of building blocks. My continuous process of quickly forming and setting the blocks permits the re-use of molds, minimizing the number required. I have provided a continuous method of pouring, forming, and pre-setting, minimizing the labor and greatly reducing the time which would otherwise be required in the manufacture of such blocks.

Having thus described my invention, what I claim is:

1. An apparatus for forming concrete blocks comprising a plurality of molds each having a bottom, movable sides and ends and a separator parallel with one of the sides, a conveyor for supporting and moving a succession of such molds, a plurality of concrete mixers for mixing concrete of different consistencies, and means for delivering the mixed concrete to the molds while they are moving, and placing the concrete of fine consistency on one side of the separator and the coarse mixture on the other side thereof, the separator being removable to permit its withdrawal, and an elongated oven positioned along the conveyor.

2. An apparatus such as set forth in claim 1 in which the mixers are positioned adjacent the conveyor and are provided with movable spouts to follow the movement of the molds on the conveyor.

3. A process of forming concrete blocks consisting of pouring concrete into molds to form a body of coarse concrete and a uniform layer of fine concrete on one side thereof, the layer projecting beyond the side, separating the layers of coarse and fine concrete during the pouring, and then permitting the uniting of the concrete while subjecting the concrete in the molds to a dry heat for a period of time sufficient to effect preliminary setting, the pouring of the concrete being effected while the molds are moving, and the movement being continued through a heating zone in which said dry heat is of four hundred or more degrees Fahrenheit and for a period of fifteen to twenty-five minutes, and then removing the molds from the blocks and storing the blocks for completion of the curing.

4. The process described in claim 3, in which both the coarse and fine concrete is completely enclosed prior to moving the blocks into and subjecting them to the heat in the heating zone.

5. An apparatus for forming concrete blocks in a continuous progression, the blocks having voids and consisting of a body of coarse concrete and a facing layer of fine concrete sloped on one side and extending below the body of the block, the apparatus including a conveyor and two concrete mixers positioned adjacent the conveyor and having movable spouts for pouring concrete into the molds while following the movement thereof, a heating oven extending along the conveyor and enclosing a portion of the same and provided with radiant heating elements, and a plurality of molds each comprising a base portion, hinged sides and removable ends, and a separator with means for positioning the separator to form the thin, fine-grain layer at one side of the block.

6. The apparatus described in claim 5 in which the mold is provided with a cover and in which the base of the mold and the cover form flat parallel load-bearing surfaces of the block and longitudinally running tongue and groove formation on the block.

BARRETT W. CHITTENDEN.

REFERENCES CITED

The following references are of record in the file of this patent:

UNITED STATES PATENTS

| Number | Name | Date |
| --- | --- | --- |
| 965,003 | Pauly | July 19, 1910 |
| 1,428,692 | Herman | Sept. 12, 1922 |
| 1,453,747 | Carey | May 1, 1923 |
| 1,471,990 | Wert | Oct. 23, 1923 |
| 1,554,585 | Lake | Sept. 22, 1925 |
| 1,872,521 | Stuckey | Aug. 16, 1932 |
| 2,350,934 | Schutte | June 6, 1944 |
| 2,402,655 | Miller | June 25, 1946 |
| 2,454,708 | Middleton | Nov. 23, 1948 |